United States Patent [19]

Leighton et al.

[11] 4,119,947

[45] Oct. 10, 1978

[54] OPTICAL SIGNAL PROCESSOR

[76] Inventors: Howard Noyes Leighton, 1500 Baylor Ave., Rockville, Md. 20850; Michael McHugh Siverling, 519 28th St., NW., Rochester, Minn. 55901; Raymond John Wilfinger, 17 Square Woods Dr., LaGrangeville, N.Y. 12540

[21] Appl. No.: 817,465

[22] Filed: Jul. 20, 1977

[51] Int. Cl.² .............................................. G06K 9/12
[52] U.S. Cl. ................ 340/146.3 AG; 340/146.3 MA
[58] Field of Search .............. 340/146.3 H, 146.3 AG, 340/146.3 MA, 34.7 AD; 307/213; 364/490, 515

[56] References Cited

U.S. PATENT DOCUMENTS

| 3,159,815 | 12/1964 | Groce | 340/146.3 AG |
|---|---|---|---|
| 3,234,513 | 2/1966 | Brust | 340/146.3 AG |
| 3,484,747 | 12/1969 | Nunley | 340/146.3 AG |
| 3,496,541 | 2/1970 | Haxby et al. | 340/146.3 AG |
| 3,701,099 | 10/1972 | Hall et al. | 340/146.3 AG |
| 3,737,855 | 6/1973 | Cutaia | 340/146.3 AG |
| 3,747,066 | 7/1973 | Vernot et al. | 340/146.3 AG |
| 3,889,234 | 6/1975 | Makihara et al. | 340/146.3 MA |
| 4,047,152 | 9/1977 | Giuliano et al. | 340/146.3 AG |

Primary Examiner—Leo H. Boudreau
Attorney, Agent, or Firm—James E. Murray

[57] ABSTRACT

An array of optically sensitive devices senses printed matter with each device in the array producing an output signal representing a single black or white element in a multi-element picture being sensed by the whole array. These output signals are fed into an analog charge transfer shift register and passed serially in a fixed sequence through an output stage of the shift register. As the signal from each device passes through this output stage the device becomes what is hereafter referred to as the device of interest and the signal produced by it is analyzed to determine whether it is a black or white element. Other output stages simultaneously sense data from devices located around the device of interest to define a subarray within the original detected array while the last of these output stages is fed to a peak comparator to sense the brightest and darkest matter detected in the recent past by any element of the array. The results of these sensings are processed in accordance with a preselected algorithm to generate a digital signal wich is an indication of whether the device of interest has detected black or white.

As the outputs of the array are shifted through the shift register each device of the array at one time or another is the device of interest of the subarray. The digital values of light intensity from all the devices in the array are then fed to a computer for analysis to determine what has been optically detected by the whole array.

10 Claims, 14 Drawing Figures

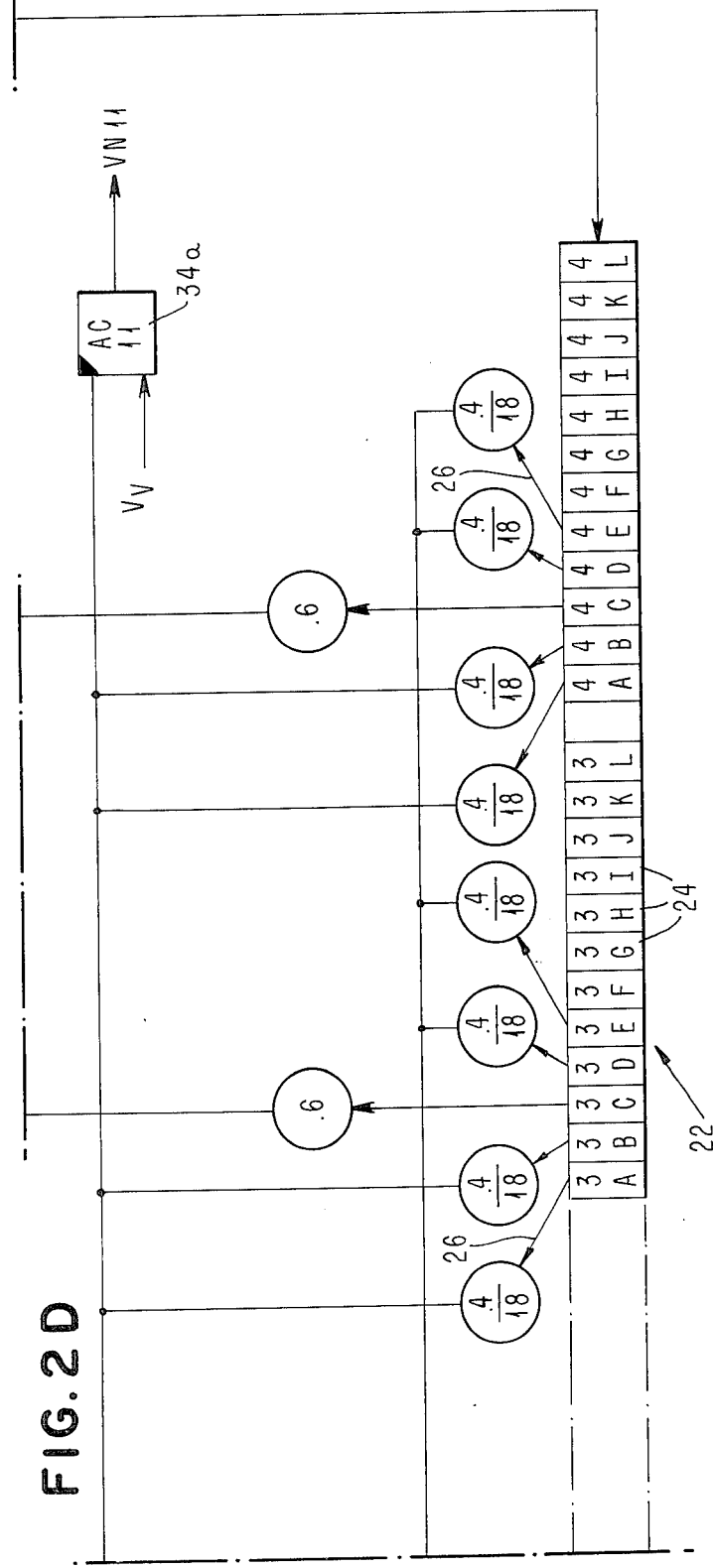
FIG. 2D
FIG. 7
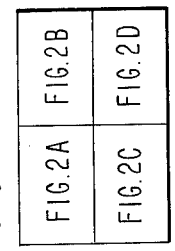

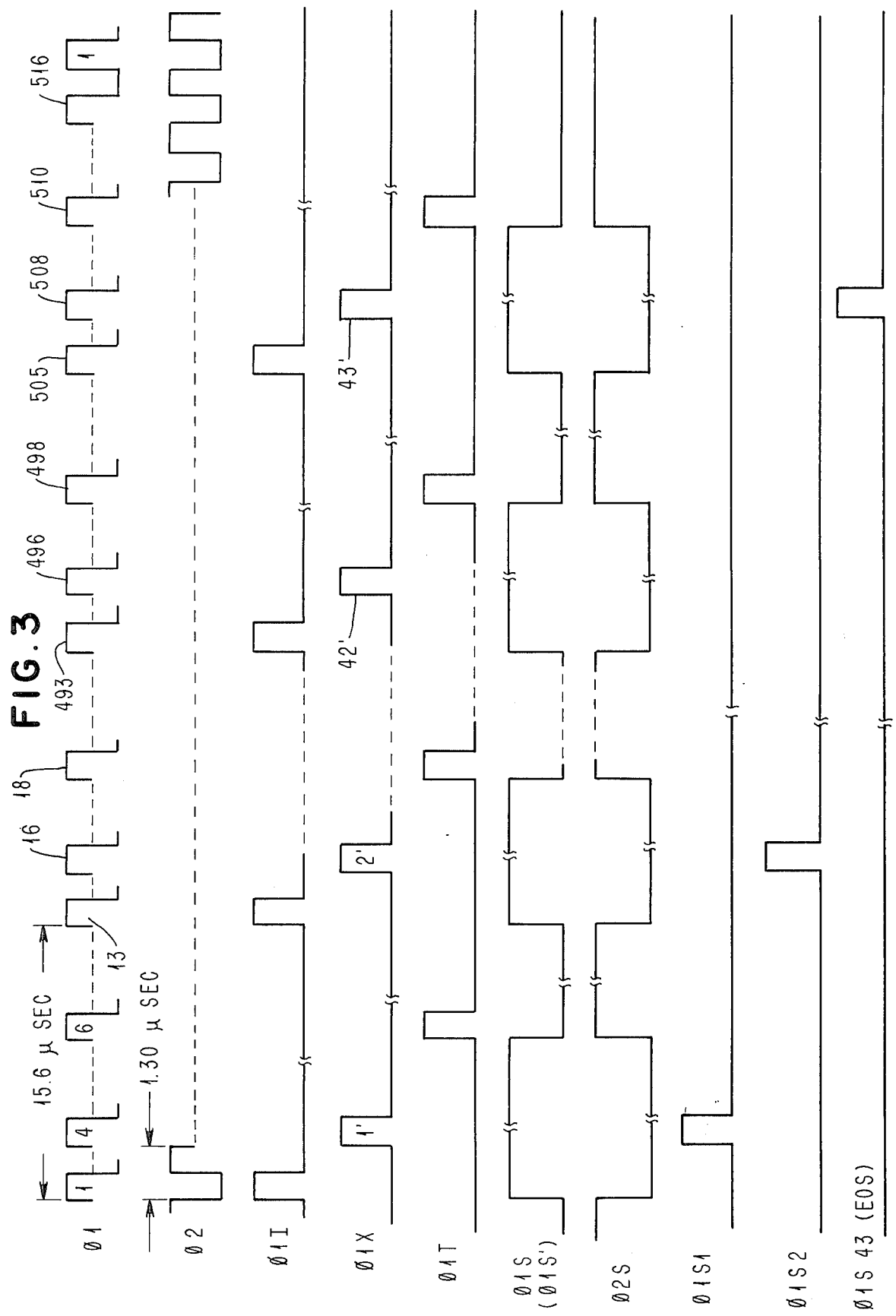

| CT | WEIGHT | C (pF) | M | COMPARATOR |
|---|---|---|---|---|
| 9C, 1C | .43 | .25 | 2.33 | AC 1, AC 9 |
| 8C, 2C | .5 | .25 | 2 | AC 2, AC 8 |
| 7C, 6C, 4C, 3C | .6 | 2(.25) | 1.67 | AC 3, AC 4, AC 6, AC 7 |

OPTICAL SIGNAL PROCESSOR

BACKGROUND OF THE INVENTION

The present invention relates to optical detectors and more particularly to compact optical detectors.

It is generally recognized that direct optical reading of printed matter can be faster, more efficient and more error free than keypunching data for entry into a computer. Optical reading usually involves four basic electrical functions. First, the actual optical scanning and sensing of the printed matter. Second, the analog preprocessing of the data generated by the scanning and sensing. Third, the turning of the preprocessed analog data into binary values and finally the actual recognition of the character being sensed using the binary information.

This invention deals with the first three of these electrical functions and in particular the preprocessing function of the optical reading procedure. Preprocessing is necessary because the documents being optically analyzed, no matter how elaborately they are printed, are not truly black or white. In fact the contrast difference between black and white may be as small as 15 percent and may vary from one position to another in the document. Preprocessing serves to accommodate such variations in contrast ratios. In preprocessing each element of the picture must be examined and a simple decision must be made. That decision is whether the area represented is black or white. To do this effectively the threshold for the decision can not be fixed but must constantly change to reflect the changing character of the written matter on the document. Many algorithms are known for doing this. One such algorithm continuously compares the signal from any given device of the array to the signals from adjacent devices of the sensing array and with recent histories of the maximum black and maximum white signals experienced during the optical reading. The signals from the adjacent elements and the signals representing the maximum black and maximum white encountered during sensing will unite in a specific way so that the data is not overly affected by any of the mentioned factors. To accomplish this is very difficult in a hand held optical reader because of the complexity of the algorithm being performed and the relatively low density of conventional integrated circuits that perform analog functions. This has made hand held readers in the prior art both expensive and cumbersome.

THE INVENTION

Therefore in accordance with the present invention a new approach is provided which will perform algorithms such as the one described above and do it using a minimum of space and power. An array of optically sensitive devices senses printed matter with each device in the array producing a signal representing a single black or white element in a multi-element picture being sensed by the whole array. These signals are fed into an analog shift register and passed in a fixed sequence through an output stage of the shift register. As the signal from each device passes through this output stage the device that produced it becomes the device of interest and the signal is analyzed to determine whether it represents a black or white element in the multi-element picture. To perform the analysis, other output stages of the shift register sense signals produced by devices located around the device of interest to define a subarray within the original detected array, and the final output stage is coupled to a peak detector for generating signals representing maximum black and white signals that occurred in the recent past. These sensed signals are processed in accordance with a preselected algorithm to produce a binary signal that indicates that the signal is either black or white. As the outputs of the array are shifted through the shift register, each position of the array at one time or another is the device of interest of the subarray so that a digital value is generated for each of the devices in the array. These digital values are fed to a computer for analysis to determine what has been optically detected by the array.

Therefore it is an object of this invention to provide improved optical detection of printed subject matter.

It is a further object of this invention to provide a hand held optical character detector with a preprocessing capability.

Other objects of the invention are to provide a hand held optical detector through the use of charge transfer techniques and capacitor ratioing which is compact, inexpensive and accurate.

THE DRAWINGS

These and other objects, features and advantages of the invention will be apparent from the following detailed description of a preferred embodiment of the invention as illustrated in the accompanying drawings of which:

FIGS. 2A to 2D are a schematic diagram incorporating the present invention to generate the subarray from the row data supplied by the array of devices.

FIG. 3 is a pulse pattern for operating the schematic diagram of FIG. 2 in accordance with the present invention.

FIG. 7 is a block diagram which shows how FIGS. 2A to 2D fit together.

FIGS. 8, 9 and 10 are circuit diagrams of the weighting circuits shown in FIG. 2.

THE EMBODIMENT OF THE INVENTION

Figure 1:
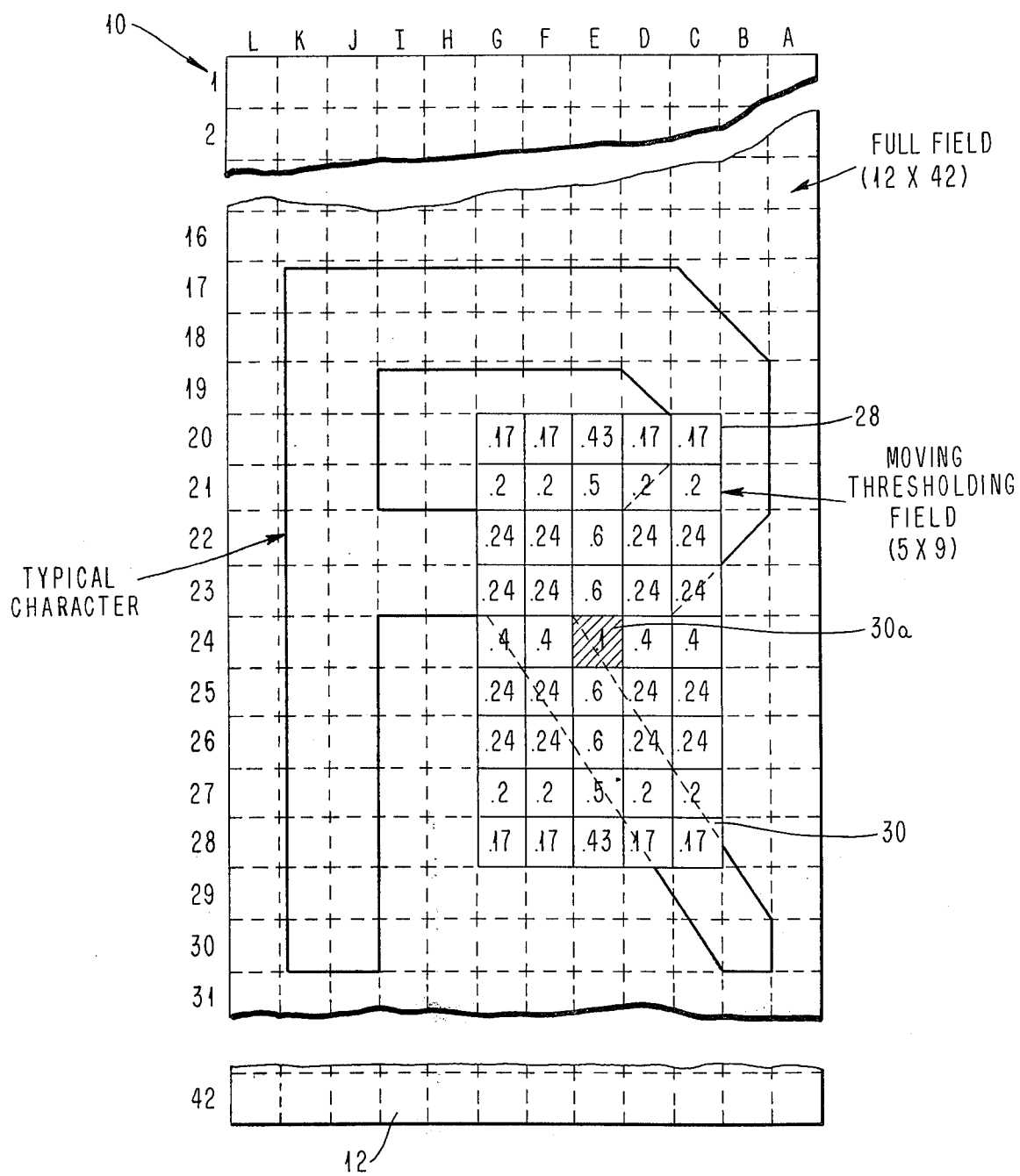
FIG. 1 is a schematic diagram showing the array of devices and a subarray thereof superimposed over the letter R.
Figure 2A:
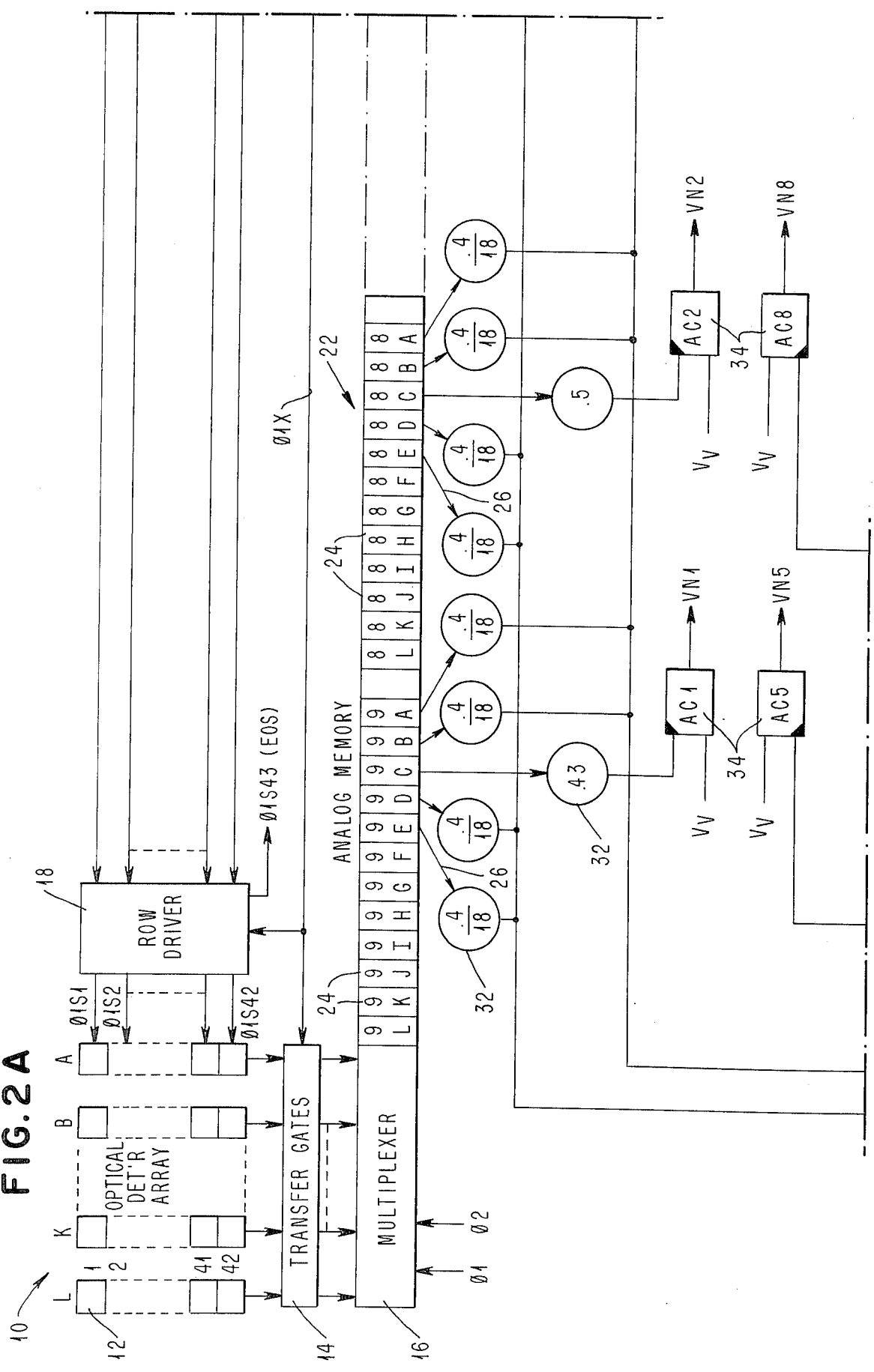
Figure 2B:
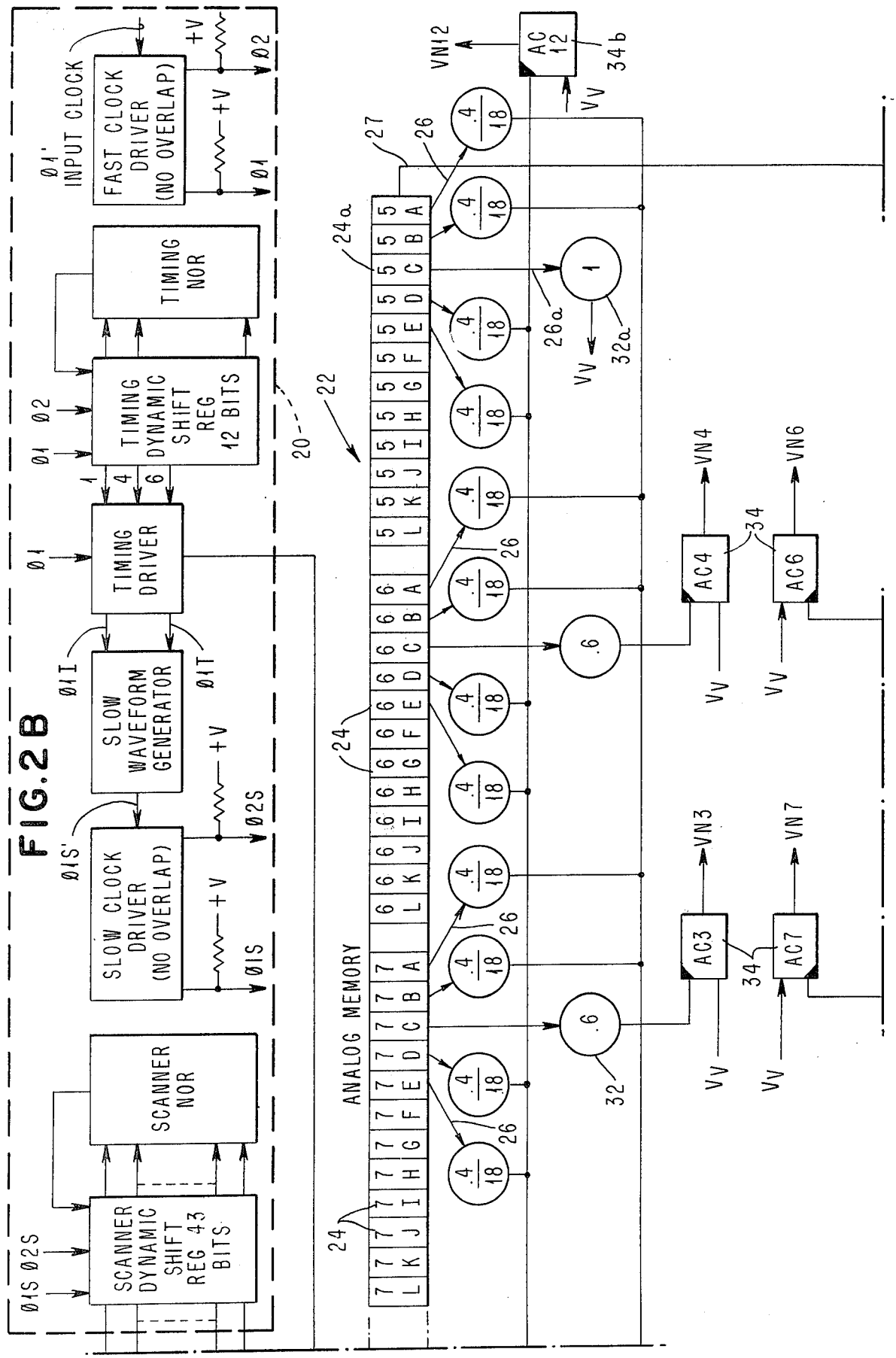
Figure 2C:
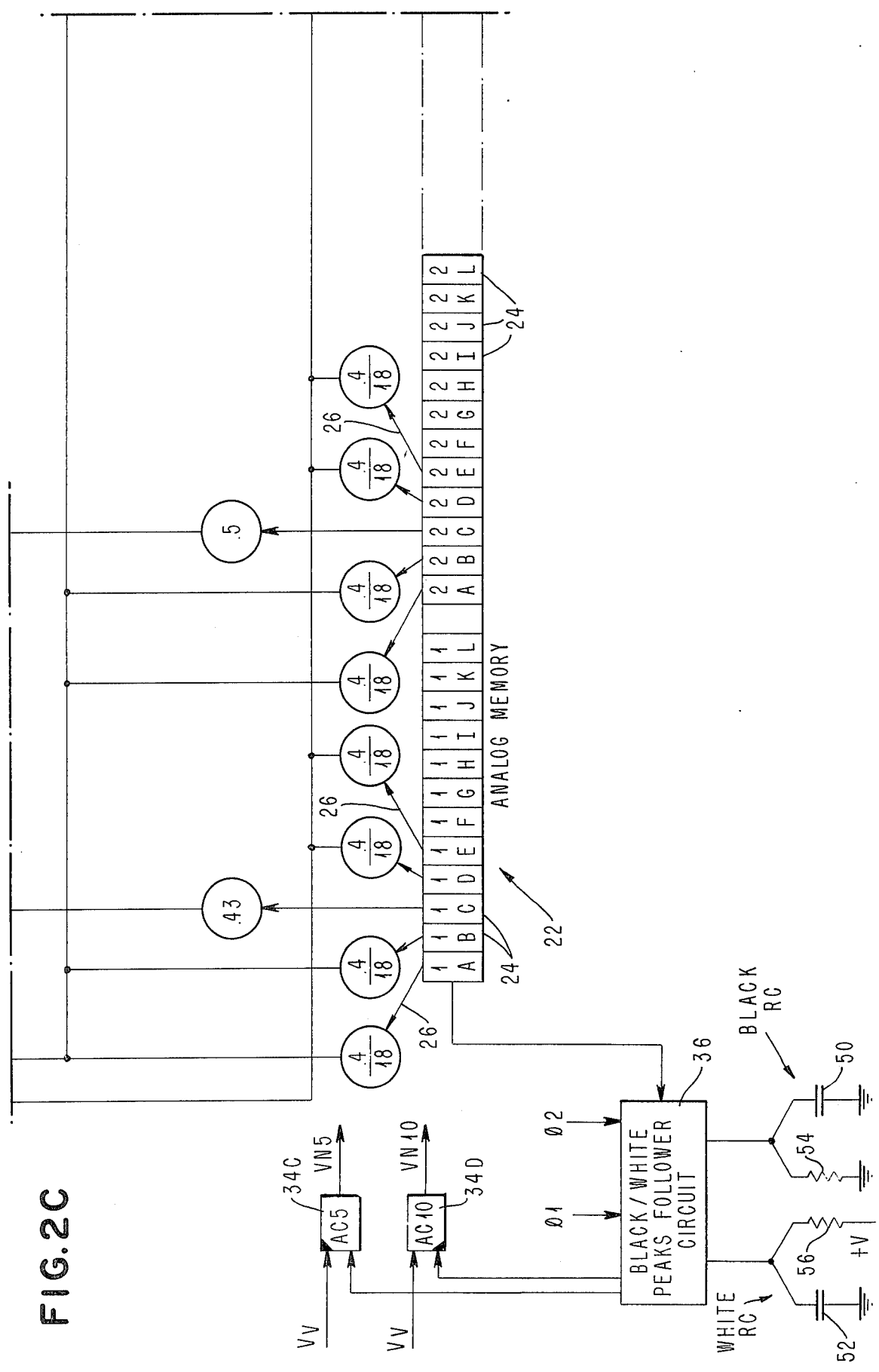

Referring to FIG. 1, optical devices 12 arranged in an array 10 which is twelve columns wide by forty-two rows long is shown superimposed over the letter "R" on a document being scanned by an optical hand held device or in other words, a wand containing the array 10. As the wand passes over the letter R, each of devices 12 produces an electrical signal approximately in proportion to the intensity of the light reaching it by reflection from the scanned document. As shown in FIG. 2, these electrical signals produced by the optical devices 12 are transferred row position by row position through transfer gates 14 into a multiplexer 16. First row 1 of the elements is transferred, then row 2 and so on until row 42 is transferred to the multiplexer 16. Sensing and transmission through the transfer gates 14 is under the control of a row driver 18 which is driven by timing circuitry 20 generating the pulse patterns shown in FIG. 3.

As the bits come out of the multiplexer they enter a shift register 22 which is divided into nine sections. Each of these nine sections has twelve stages 24, the last five stages of each section having an output terminal 26. These nine sections with five outputs each in effect superimpose a dynamic nine by five subarray 28 with an odd number of locations 30 on the array of FIG. 1. The central location 30a of this array 28 (or in other words the output 26a) is referred to as the bit of interest. As the data moves down through the shift register a bit of data from each of the optical devices 12 of array 10 passes into stage 24a of the shift register and becomes the bit of interest while bits of data from the devices 12 positioned around the element producing the bit of interest are the other outputs of the shift register.

In FIG. 2 each of the shift register stages contains a number and a letter. They represent the row and column location in FIG. 1 of the device 12 producing the bit of data then resident in the stage. For instance, the bit of interest in FIG. 2 is from the device at location C5 in FIG. 1. This does not coincide with the location of the bit of interest illustrated in FIG. 1 which is E24

As can be seen from FIG. 1, the shape of the subarray 28 superimposed on the array 10 is rectangular. This is determined by the algorithm being implemented and is set by which stages 24 in the shift register 22 have outputs 26. If the algorithm dictated, the subarray could have a different size or shape such as a cross or a diamond. This could be effected by changing the number and/or location of the outputs 26 in relation to the stages of the shift register 22.

Each output 26 of the shift register is passed through a circuit 32 which multiplies or weights each of the outputs in accordance with some algorithm. In the algorithm mentioned above, the position of interest 30a is given a weighting or multiplication factor of 1 by circuit 32a. All of the other positions of subarray 28 are given a weighting which is some fraction of 1 by the other circuits 32. The values of these weightings is shown in the squares of FIG. 1 that represent the elements 30 of the subarray 28. It should be understood that if another algorithm is used the values of the weighting would be different.

The output signal from the position of interest is compared with the outputs of all the other circuits in comparator circuits 34. All the signals from readings taken from devices in the subarray to the right of the position of interest are summed and weighted and fed to a single comparator 34a. Likewise all the signals from readings taken by devices in the subarray to the left of the position of interest are fed to a single comparator 34b. Comparisons for signals generated by readings of devices above and below the position of interest are done in individual comparators 34. Other algorithms may require different sets of comparisons.

The output from the final stage of the shift register 22 is fed to a peak follower circuit 36 which stores signals which are representative of the blackest and whitest signals sensed in the past by the array 28. These two signals are also weighted and compared to the output of the weighting circuit 32a in comparators 34c and 34d. The outputs of all the comparators 34 are fed to a clocked NOR circuit 38 which at time T1 produces a logical "0" if any one of the twelve weighted inputs to the comparators is greater (or blacker) than the location 30a of interest. This indicates the device of interest detected a white element in the multi-element picture. Alternatively a logical "1" is produced by the NOR circuit 38 if none of the weighted inputs to the twelve comparators is greater or blacker than the output of the circuit 32a. This indicates the device of interest has produced a black element in the multi-element picture.

Figure 4:
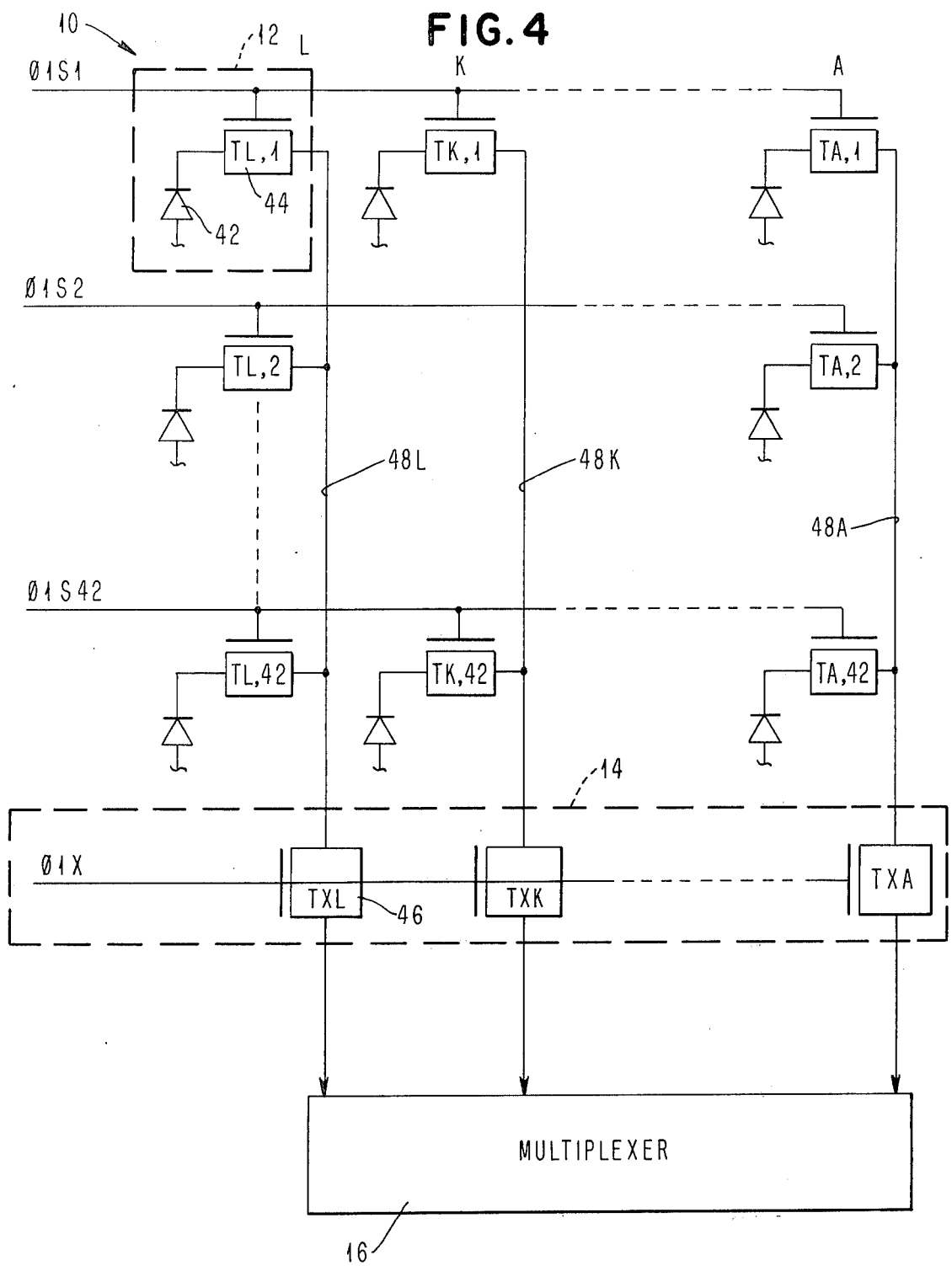
FIG. 4 is a circuit diagram of the array of photosensitive devices shown in FIG. 2.

Referring to FIG. 4, the basic optical cell 12 consists of one photo diode 42 and one FET 44. The photo diode and FET are actually a part of a long analog delay line which includes the transfer gates 14, the multiplexer 16 and the analog memory 22.

In operation, the photo diode junction capacitance is charged to the reference voltage of the long analog delay line circuit 14, 16, 22 when the row of the array 10 containing the cell is selected for reading. This occurs once every forty-three cycles by biasing the gate of device 44, making the device conductive with $\phi 1S1$ and device 46 conductive with $\phi 1X$. During the other forty-two clock cycles light on the diode 42 discharges the junction capacitance at a rate dependent on the intensity of the light. The momentary reduction in the voltage on the signal line 48L is proportional to the intensity of the light sensed by the cell 12 and this electrical analog of the optical information is transmitted through the transfer gates 14 to the multiplexer 16 and from there is propagated through the analog memory 22.

Figure 5:
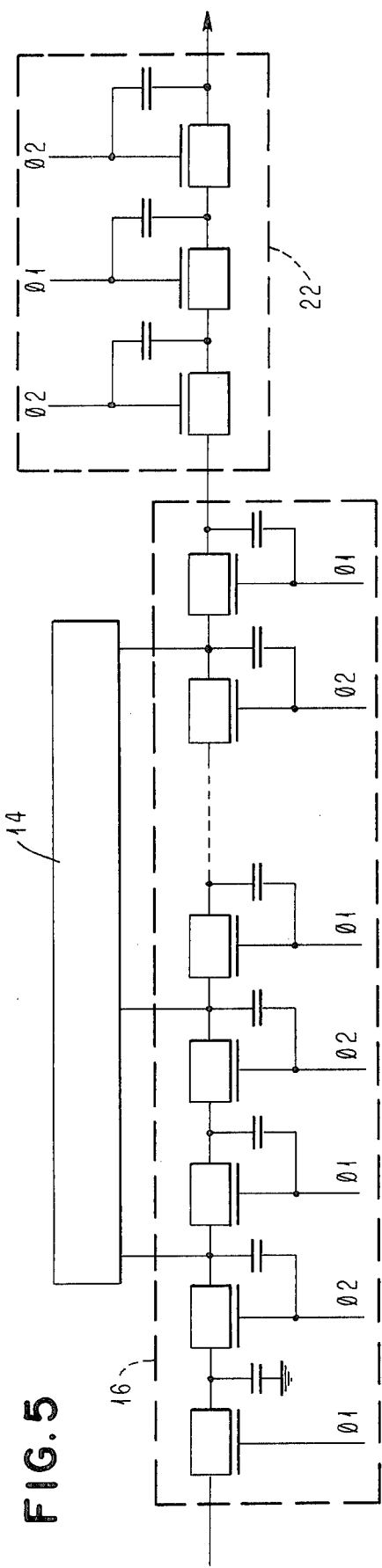
FIG. 5 is a circuit diagram of the multiplexer shown in FIG. 2.

As shown in FIG. 5, electrical signals from an entire row of storage cells are loaded into the multiplexer 16 during each clock cycle by the transfer gates 14 which isolate the column lines from the multiplexer 16 during its high speed operation.

The multiplexer 16 accepts the video information from the twelve columns in parallel and serializes it. The multiplexer 16 operates 12 times during one clock cycle of the array 10. Each time the transfer gates 14 allow data to enter the multiplexer 21 the data is quickly shifted 12 bits to the right to make room for the next transfer of data.

Figure 6:
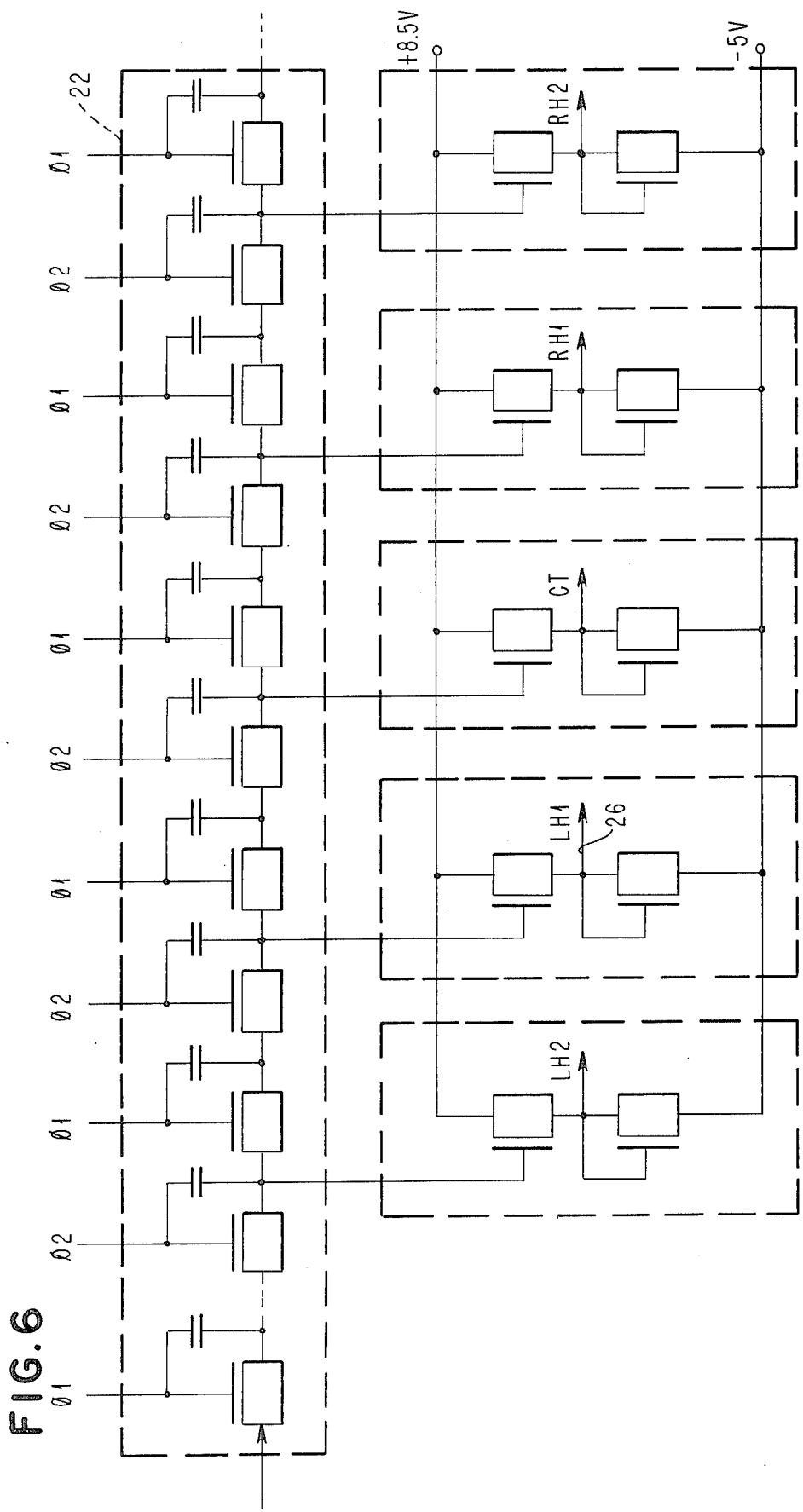
FIG. 6 is a circuit diagram of a section of the analog memory and its outputs shown in FIG. 2.

The analog memory 22 is an extension of the multiplexer 16. Its purpose is to "spread-out" the data from the five by nine subarray 28 so that all data in the subarray 28 can be read simultaneously. As pointed out previously, taps 26 are located, in groups of five, at nine places along the memory 22 corresponding to the forty-five positions of the subarray 28. Source followers perform the non-destructive readout at the taps. FIG. 6 shows a section of the memory 22 with the source followers at the taps or outputs 26.

As shown in FIG. 2, analog information in the memory 22 eventually finds its way to the black/white peak follower circuit 36. The purpose of this circuit is to store both blackest black and whitest white signals measured. This information is long term data, or history, about the nature of the document being scanned and supplements the short term data gathered in the subarray 28. The black signal (the most positive signal) and the white signal (least positive) are stored on their respective capacitors 50 and 52. The stored data is also kept up to date by discharging the black capacitor to white and the white capacitor to black using resistors 54 and 56. The resulting voltage across the two capacitors 50 and 52 is weighted. In accordance with the algorithm used herein black is weighted by 0.2 and white is weighted 0.85 but then summed to 0.15 of absolute black. By weighting white and summing to absolute black a contrast difference threshold of 15 percent is set. Thus sustained signals of less than 15 percent contrast difference are interpreted as white.

Figure 8:
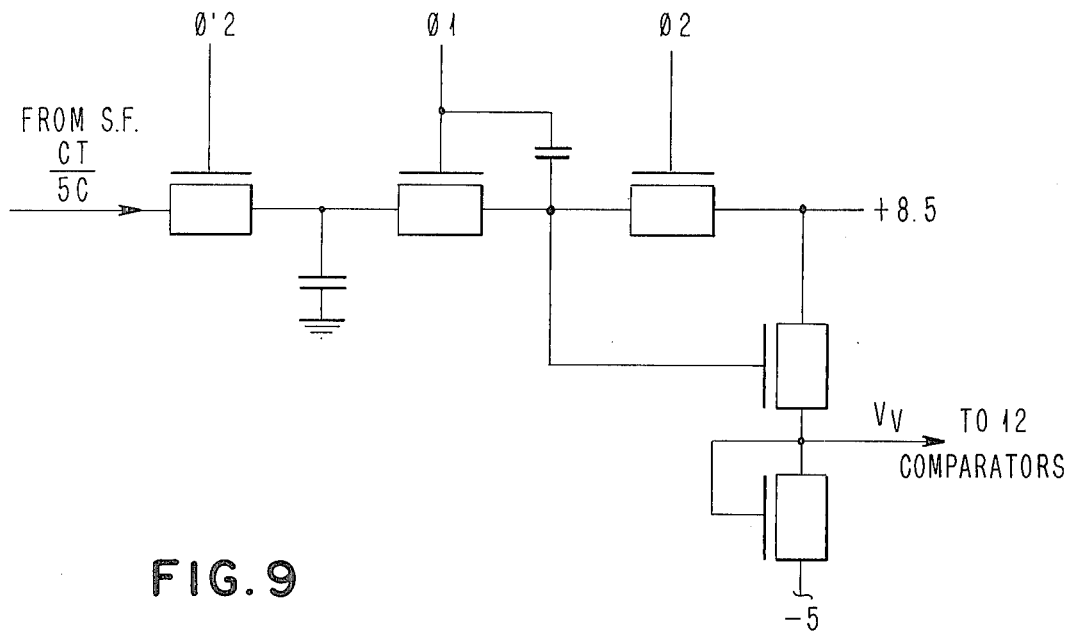
Figure 9:
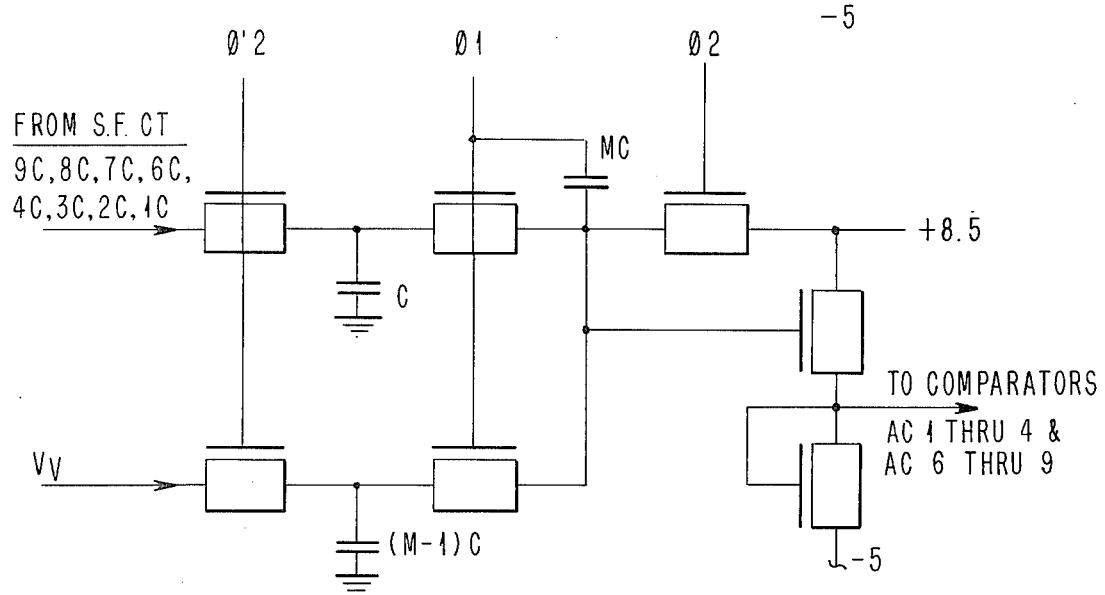
Figure 40:
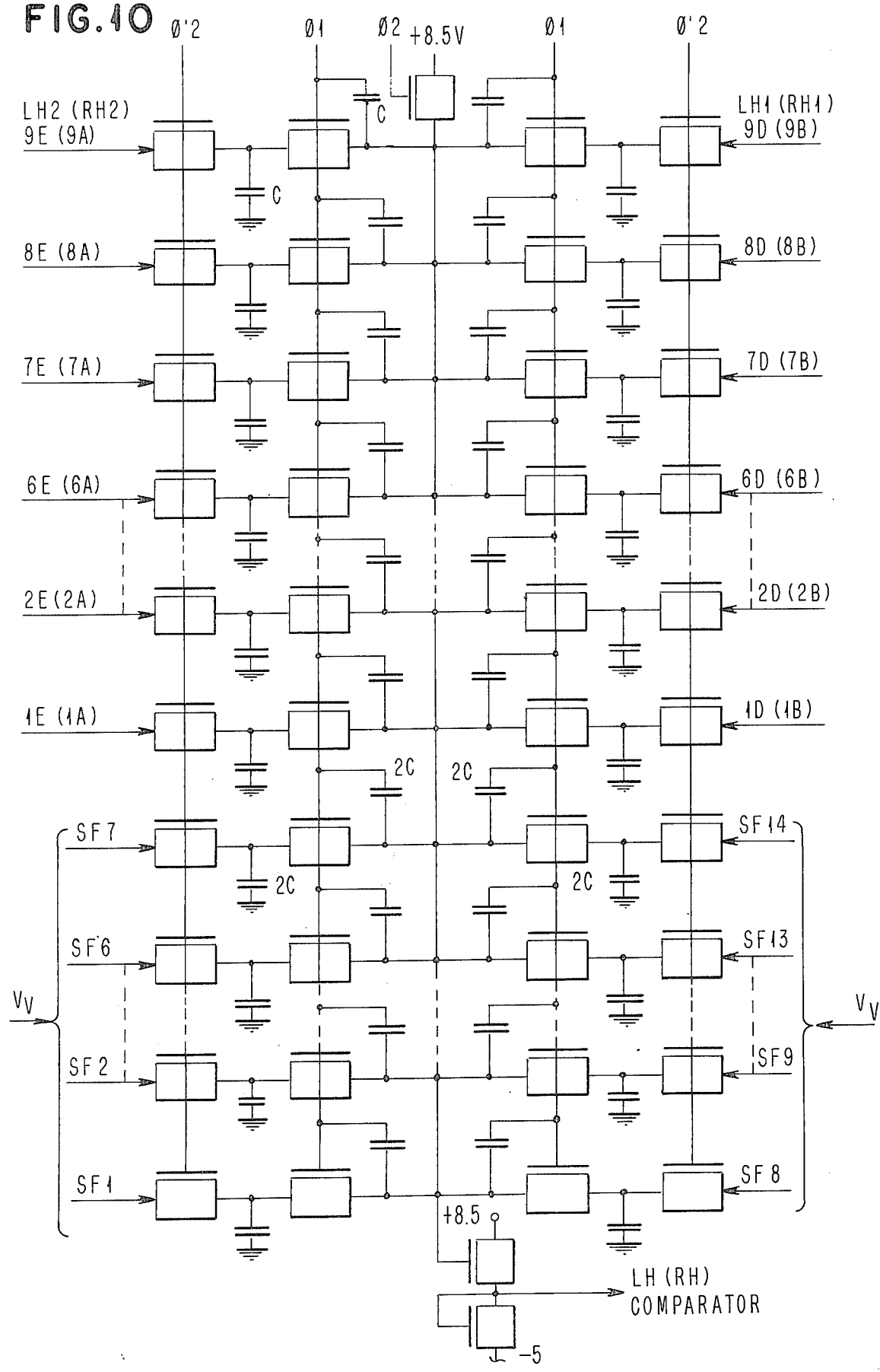

The outputs of the source followers shown in FIG. 6 are connected in turn to one of the tap weight circuits shown in FIGS. 8, 9 and 10. As pointed out previously, output 32a corresponds to the device of interest in the five by nine subarray 28. This output is connected to the unity tap weight circuit shown in FIG. 8. As mentioned earlier, weighting is done with capacitor ratioing. Capacitor ratioing is compact, requires little power and has been demonstrated to be controllable with high accuracy as shown in patent application Ser. No. 829,418 filed Aug. 31, 1977 by J. F. Dubil et al, entitled, "Bucket Brigade Circuit For Signal Scaling" and assigned to the same assignee as this invention.

The remaining center eight tap weights all have the same circuit configuration as shown in FIG. 9 and differ only in their capacitor values. Because the video signal rides on an offset voltage inherent in the source followers a complement to the multiplied offset voltage must be added before making the voltage comparison.

As can be seen in FIG. 10, the taps on either side of the center taps are summed together with their respective sides at nine places. The result is a left hand bus and a right hand bus each summing eighteen taps. The entire circuit shown in FIG. 10 occurs twice in FIG. 2.

Figure 11:
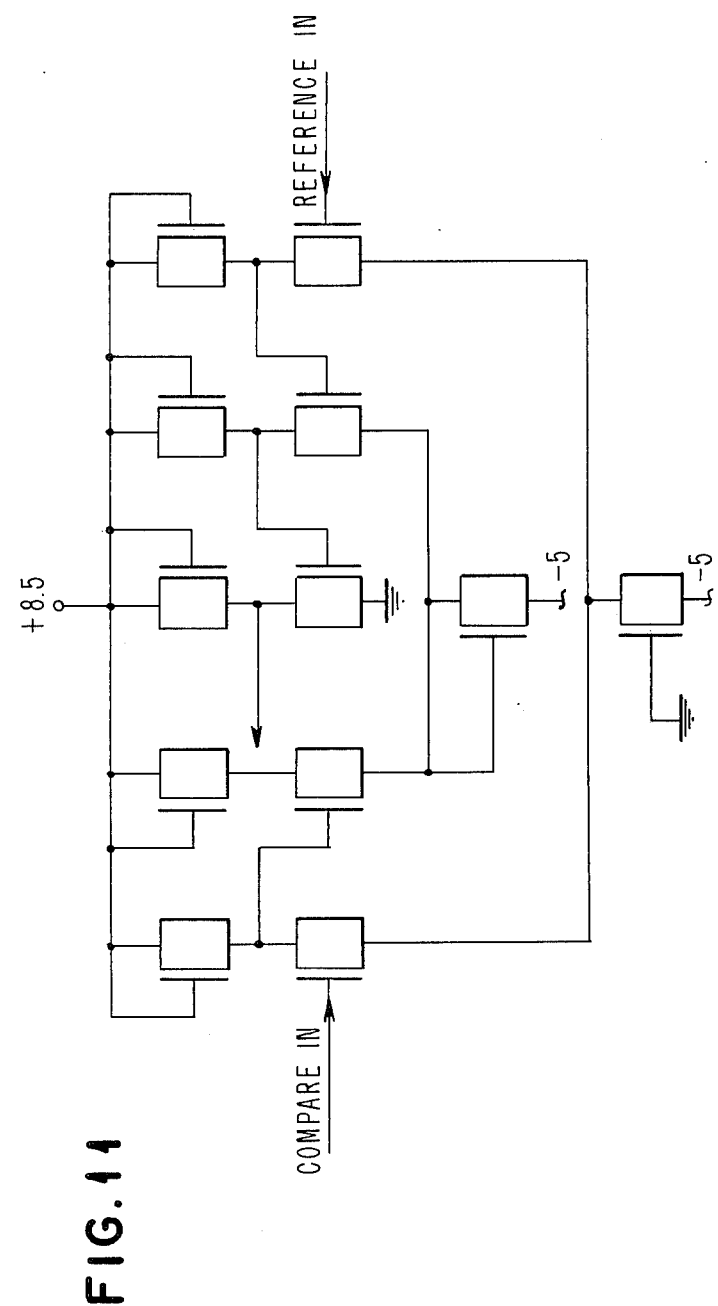
FIG. 11 is a circuit diagram of the comparators shown in FIG. 2.

As can be seen from FIG. 2 the weighted signals are all compared to the video signal from the unity tap weight. The analog comparator used to make all the comparisons is shown in FIG. 11.

The outputs of the twelve comparators are all used to drive the NOR circuit in FIG. 2. Thus if any of twelve weighted analog signals is greater (blacker) than the signal from the device of interest the output of the NOR circuit is a logic "0" or white. Conversely if the signal from the device of interest signal is greater (blacker) than all other NOR circuits generates a logic "1" signifying black.

Above we have described a single embodiment of our invention, many changes can be made in that embodiment. For instance, the embodiment has been done using static values for the weighting, position and number of outputs. These would be dynamically selected by external logic as detection progressed if the algorithm used in detection required it. In addition, the device employed in fabricating the preferred embodiment is a storage transfer device such as a bucket brigade circuit or charged coupled device. Other types of devices could be employed in place of all or part of the charge transfer devices if the application warrants it. Therefore, while the invention has been particularly shown and described with reference to a preferred embodiment thereof, it will be understood by those skilled in the art that the above and other changes in form and details may be made therein without departing from the spirit and scope of the invention.

What is claimed is:

1. An optical read circuit on a large scale integrated circuit chip for reading printed matter from documents comprising, an integrated circuit array of optically sensitive devices on said chip each device generating a signal made up of charge packets which are analog in magnitude and discrete in time, whose magnitude represents the intensity of light reflected from the document for a single element in a multi-element picture generated by the whole array of optically sensitive devices, an integrated circuit scanning means on said chip for sequentially selecting each of the devices to be the device of interest so that the signal generated thereby can be analyzed to determine whether it is a black or white element of said multi-element picture, said scanning means including memory means for storing said signals produced by the array of optically sensitive devices including charge signals from the device of interest and from devices surrounding the device of interest in a preselected pattern to form an information base for making the analysis of the signal from the device of interest, and an integrated circuit analysis means on said chip for generating a binary signal indicative of whether said signal from the device of interest is a black or white element in said multi-element picture said analysis means including:

an integrated circuit weighting means on said chip for weighting all said signals from said information base relative to said signal from the device of interest, an integrated circuit comparison means on said chip comparing each of said weighted signals to the analog signal from the device of interest, and an integrated circuit logic means for producing the binary signal on the basis of the comparisons made by the comparison means.

2. An optical read circuit for reading printed matter from documents, comprising:

an array of optically sensitive devices each device generating an analog signal whose magnitude represents the intensity of light reflected from the document for a single element in a multi-element picture generated by the whole array of optically sensitive devices;

scanning means for sequentially selecting each of the devices to be the device of interest so that the analog signal generated thereby can be analyzed to determine whether it is a black or white element of said multi-element picture, said scanning means including memory means for storing analog signals produced by the array of optically sensitive devices including analog signals from the device of interest and from devices surrounding the device of interest in a preselected pattern to form an information base for making the analysis of the analog signal from the device of interest; and analysis means for generating a binary signal indicative of whether the analog signal from the device of interest is a black or white element in said multi-element picture said analysis means including:

weighting means for weighting all the analog signals from said information base relative to the analog signal from the device of interest;

comparison means comparing each of the weighted analog signals to the analog signal from the device of interest; and logic means for producing the binary signal on the basis of the comparisons made by the comparison means;

said scanning means including a multiplexer means for changing the analog signals into a serial string of pulses and said memory means being an analog multi-stage shift register means having an input for receiving the serial string of analog pulses produced by the multiplexer means and having a series of spaced outputs at different stages of the shift register for providing the signals making up the information base.

3. The optical read circuit of claim 2 including a peak detector means for storing maximum and minimum magnitude signals produced by said optically sensitive devices and supplying them to said analysis means as part of the information base.

4. The optical read circuit of claim 2 including a peak detector means coupled to one of the outputs of said shift register means for storing maximum and minimum signals produced by said optically sensitive devices and supplying them to said analysis means as part of the information base.

5. The optical read circuit of claim 2 wherein said logic means is a NOR circuit which provides one type of binary signal indicating the signal produced by the device of interest is a black element when one of the comparator means indicates a weighted signal exceeds the magnitude of the signal of the device of interest and otherwise produces the other type of binary signal indicating the device of interest is a white element.

6. The optical read circuit of claim 2 wherein said multiplexer means and said shift register means are charge transfer devices.

7. The optical read circuit of claim 6 wherein said charge transfer devices are bucket brigade circuits.

8. The optical read circuit of claim 2 wherein said weighting means are capacitor dividing networks.

9. The optical read circuit of claim 2 wherein said optically sensitive devices are each a photosensitive diode.

10. The optical read circuit of claim 9 including:
a field of intersecting bit and word lines,
a three terminal semiconductor device with a control terminal and controlled path at each intersection of the bit and word lines coupling one of the photosensitive diodes to the bit line at the intersection through the controlled path and coupled to the word line at the intersection by its control terminal.

* * * * *

UNITED STATES PATENT AND TRADEMARK OFFICE
CERTIFICATE OF CORRECTION

PATENT NO. : 4,119,947

DATED : October 10, 1978

INVENTOR(S) : H. N. Leighton, Et Al.

It is certified that error appears in the above-identified patent and that said Letters Patent are hereby corrected as shown below:

Front page: The assignee should be designated as -- International Business Machines Corporation, Armonk, New York --.

Signed and Sealed this

Twentieth Day of February 1979

[SEAL]

Attest:

RUTH C. MASON
Attesting Officer

DONALD W. BANNER
Commissioner of Patents and Trademarks